(12) United States Patent
Squitieri

(10) Patent No.: US 8,001,744 B1
(45) Date of Patent: Aug. 23, 2011

(54) METHOD OF GROUTING COMMERCIAL KITCHEN FLOORS USING A TWO-PART REACTIVE EPOXY GROUT

(76) Inventor: John Squitieri, Suffern, NY (US)

( * ) Notice: Subject to any disclaimer, the term of this patent is extended or adjusted under 35 U.S.C. 154(b) by 5 days.

(21) Appl. No.: 12/487,213

(22) Filed: Jun. 18, 2009

(51) Int. Cl.
*E04G 21/20* (2006.01)
*E04B 1/68* (2006.01)

(52) U.S. Cl. .................. 52/742.16; 52/747.11; 427/284; 427/285

(58) Field of Classification Search .................. 451/451, 451/453–458, 344, 358–359; 30/124, 390; 83/100, 544; 52/383–392, 745.19, 745.2, 52/746.1, 749.11, 745.21, 741.13, 741.14, 52/741.4, 741.41, 742.12, 742.14, 742.16, 52/745.05, 745.06, 746.12, 747.1–747.11; 427/284, 285
See application file for complete search history.

(56) References Cited

U.S. PATENT DOCUMENTS

| | | | | |
|---|---|---|---|---|
| 3,239,981 A * | 3/1966 | Fitzgerald | ........................ | 428/44 |
| 4,334,356 A * | 6/1982 | Krosunger | ........................ | 30/374 |
| 4,373,264 A * | 2/1983 | Hamaker | ........................ | 30/374 |
| 4,832,995 A * | 5/1989 | McLauchlin | ........................ | 428/49 |
| 4,913,204 A * | 4/1990 | Moores et al. | ........................ | 144/136.95 |
| 4,922,616 A * | 5/1990 | Bensel | ........................ | 30/374 |
| 6,283,843 B1 * | 9/2001 | Romagnoli | ........................ | 451/523 |
| 7,799,381 B2 * | 9/2010 | Lian et al. | ........................ | 427/282 |
| 2006/0151531 A1 * | 7/2006 | Tikusis | ........................ | 222/145.6 |
| 2006/0288499 A1 * | 12/2006 | Kimball et al. | ........................ | 8/550 |
| 2008/0085266 A1 * | 4/2008 | Santin | ........................ | 424/93.21 |
| 2008/0141603 A1 * | 6/2008 | Harvey et al. | ........................ | 52/315 |

\* cited by examiner

*Primary Examiner* — Jeanette E. Chapman
(74) *Attorney, Agent, or Firm* — Richard A. Joel, Esq.

(57) ABSTRACT

A process for grouting floors using a two-part reactive epoxy grout formulation comprising two distinct components (parts) which can utilize a two-part cartridge for storing, metering and having a means of attaching a static mixer tube to the front of the cartridge for inline mixing of the epoxy components as they are being dispensed directly into the grout joint. The cartridge contains a resin and pre-colored hardener, which maybe heated to accelerate the cure speed in cold environments if necessary, mixed, and applied to an empty grout joint-line by means of a static mixer tube that acts as a mixer-nozzle. Masking tape or other protective material is placed on both sides of the joint-line prior to grouting to prevent epoxy contacting tile faces. The grout is dispensed directly into the grout joint by the applicator gun pressurizing the cartridge pistons to flow epoxy resin and hardener in the correct mix ratio through the static mixing nozzle. A leveling tool is used to even out the dispensed grout into the grout joint and remove excess material before curing. By means of the reactivity of the hardener and resin, which are mixed in the proper stoichiometric ratios, the epoxy will cure in the designed period of time to allow full use within hours after application. A two-part methyl methacrylate grout formulation can be used in grouting new tiled floors or regrouting existing tiled floors with the same procedures as the two part reactive epoxy grout.

2 Claims, 2 Drawing Sheets

METHOD OF GROUTING COMMERCIAL KITCHEN FLOORS USING A TWO-PART REACTIVE EPOXY GROUT

CROSS REFERENCE TO RELATED APPLICATIONS

Not applicable.

STATEMENT REGARDING FEDERALLY SPONSORED RESEARCH OR DEVELOPMENT

Not applicable

PARTIES TO A JOINT RESEARCH AGREEMENT

Not applicable

BACKGROUND OF THE INVENTION

This invention relates to floor grouting and in particular to a new and improved process for regrouting commercial floors using a two-part reactive epoxy grout including but not limited to: kitchen, bathroom, lobby, food service area floors where high traffic, aggressive chemicals or severe methods are used in daily cleaning.

FIELD OF THE INVENTION

A large number of commercial kitchen floors are constructed with commercial tiles including quarry, ceramic, glazed and other durable compositions which have grout joints (spaces between tiles can vary) to separate the tiles. The grout used to fill these spaces typically is sanded grout for large widths and unsanded for narrower width joints. These grout preparations are mixed with water, and/or have epoxy or acrylic fortifiers (binders) to increase compressive strength, and other performance properties. Some newer grout compounds are two-part epoxies which are water-soluble before curing for easy clean up. The two-part epoxies comprise actually three parts, a first part made up of epoxy resin, then a hardener and finally some form of aggregate, such as quartz, sand or mineral fillers that are mixed with the epoxy components before installation to reinforce the epoxy resin, minimize shrinkage and cheapen the material cost by using a low cost filler to extend the volume of the product.

These traditional mixtures are applied to grout joints by the conventional method of "floating" the grout into the joints, i.e. installing grout using a rubber "float" to sweep the mixed grout paste into the grout joints, and being able to do large areas at one time. Clean up is performed using water and rags or sponges for cleanup of the tile surfaces to remove excess grout and provide a clean tile face. Water based grout with and without binders, and epoxy grouts are mixed by hand in pails or containers off-line, and applied according to manufacturers' instructions using floats to squeegee the mixed grout into the joint lines. Water based systems are basically Portand cement based mortars, with pigments and aggregate fillers to help prevent shrinkage. Set-up time for each system varies depending upon tiles used, joint width, ambient air temperatures/humidity, and temporary protective coverings if used. Inadequate curing (set-up) times, i.e. less than 72 hours at 23° C. for epoxy grout or mortar is especially detrimental to its performance and if put into service, voids the warranty, and if used before proper set up with daily cleanings and heavy food traffic will cause short-term degradation. New cleaning solutions such as enzyme cleaners are especially damaging to the water based and water clean up epoxy-based systems and cause premature joint failure due the chemical attack of the cleaners on the mortar or uncured epoxy systems.

In commercial kitchens, floor grout is subjected to various cleaning chemicals, food acids, high-pressure washings and/or the use of hot water plus extremely high traffic. The combination of these factors causes the breakdown and erosion of commercially available grouts typically used in commercial kitchens. Neither grout mixed with water or water-based epoxy grout are particularly effective in preventing the grout from breaking down, disintegrating and ultimately pulverizing and pulling out of the joint under severe conditions of use. This results in an empty or partially empty joint line which is a violation of the health codes, which require a totally intact, smooth, sealed floor in food service areas.

D. Best Inc., d/b/a Marcoat of Suffern, N.Y. has developed a proprietary two-part epoxy grout that has been designed specifically for use in commercial kitchens to overcome these shortcomings. Unlike water-based grout or three-part epoxy grouts, this totally reactive epoxy grout does not rely on aggregate fillers for strength but is inherently a structural adhesive and sealant used in marine and construction applications. Applicant has developed a unique process for regrouting existing floors and grouting new commercial floors using this specialized epoxy grout for new and renovated tile floor systems.

DESCRIPTION OF RELATED ART INCLUDING INFORMATION DISCLOSED UNDER 37 CFR 1.97 & 1.98

The prior art includes U.S. Pat. No. 6,881,768 to Rooshenas which is directed to an epoxy grout. While not directly in point with its disclosure of specific grout compositions, the patent does cite several important considerations in tile setting, which the present inventor has taken into account, for example, workability of the grout, stain resistance and maintaining a clean work area by use of masking materials. The present invention encompasses all of these features in a tile-grouting context.

Pat. Pub. US 2009/0044727 is of some interest since it discloses epoxy additives for cement grouts. U.S. Pat. No. 7,527,861 discloses a jobsite-renewable multilayer floor finish with an enhanced hardening rate.

Also of interest are U.S. Pat. No. 7,241,828 for a grout composition, dispenser, and method of use and U.S. Pat. No. 6,545,068 which relates to grout compositions.

SUMMARY OF THE INVENTION

This invention discloses a unique process for grouting commercial tile floors as a renovation process, as well as installing grout into a new tiled floor with a reactive epoxy grout which is highly resistant to chemical cleaning agents or methods, high traffic, food acids. These factors will lead to disintegration and ultimately failure with traditional grout products but are withstood by the new system for years with no change in performance.

The process involves using the reactive epoxy grout packaged in a two-part cartridge for safe, easy, automatic metering in applying the grout to an existing floor being renovated. The existing damaged grout is mechanically removed; masking tape or other protective material is applied on both sides of the grout joint to prevent the epoxy grout from coming in contact with the tiles and requiring cleanup. Marcoat® epoxy grout is deposited directly into the grout joint without touching the tile surfaces, only the edges. When all joints running in one direction have been filled with premixed epoxy grout, a leveling tool, such as a rubber or plastic blade is used to smooth the epoxy surface level even with the tile tape and evenly distribute the grout into the joint, and remove excess.

After all taped joint-lines have the Marcoat® epoxy grout dispensed into the grout joint-lines, the tape is removed and the grout joints become tack free in a short period of time due to the reactive nature of the epoxy curing system. The operation is then repeated for joint-lines running in the opposite direction to make a crosshatch pattern of joint lines on every side of the tiles, firmly securing and sealing all tile edges.

Accordingly, an object of this invention is to provide a new and improved process for grouting floors, both existing tile floors and new construction tile floors.

Another object of this invention is to provide a new and improved process for regrouting (renovation) commercial floors with a reactive epoxy grout.

A further object of this invention is to provide a unique process for regrouting commercial kitchen floors with a two-part epoxy grout having a rapid cure, low odor, custom formulated colors and is prepackaged and capable of using static mixer tubes.

A still further object of this invention is to provide a fast unique regrouting process for commercial floors using a two-part epoxy grout in a prepackaged metering cartridge having a rapid cure time and being easily applied and resistant to deterioration.

BRIEF DESCRIPTION OF THE DRAWINGS

The above and other objects and advantages of the present invention may be more clearly seen when viewed in conjunction with the accompanying drawings wherein:

FIGS. 3A-C are perspective views showing the application of epoxy grout into the grout joint on a tile floor wherein:

FIG. 3A shows the application of epoxy grout from an air-operated dispensing gun;

FIG. 3B shows the process of leveling tooling evening out the epoxy grout in a grout joint; and, FIG. 3C shows the removal of tape from the floor.

DETAILED DESCRIPTION OF THE INVENTION

Figure 1:
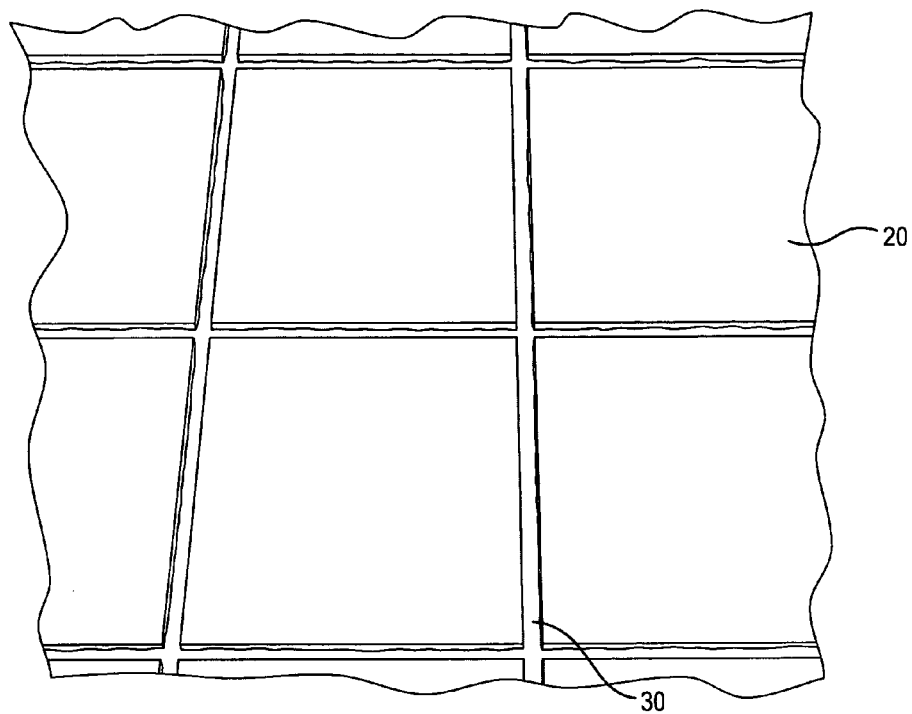
FIG. 1 is a perspective view of a tile floor having deteriorated and missing grout.
Figure 2:
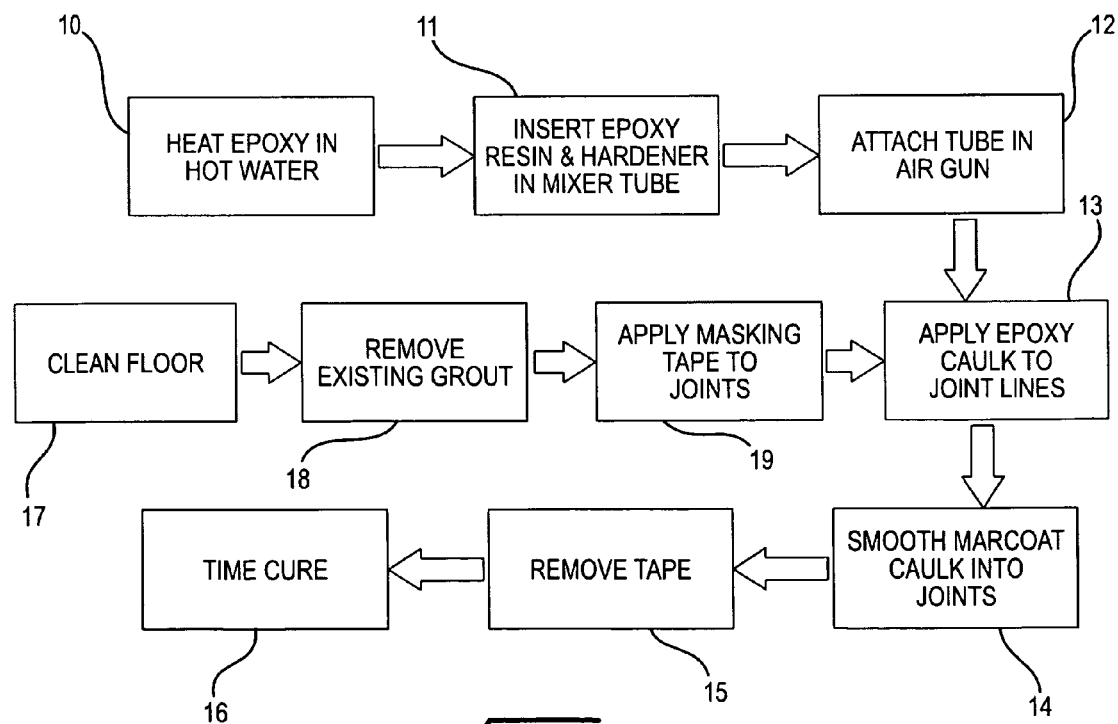
FIG. 2 is a flowchart depicting the method steps of this invention.

Referring now to the drawings, FIG. 1 of the drawings depicts tile 20 with deteriorated grout 30 on a floor which is the object of this regrouting process disclosed herein. FIG. 2 discloses the process of this invention which involves steps 1-16.

Figure 3A:
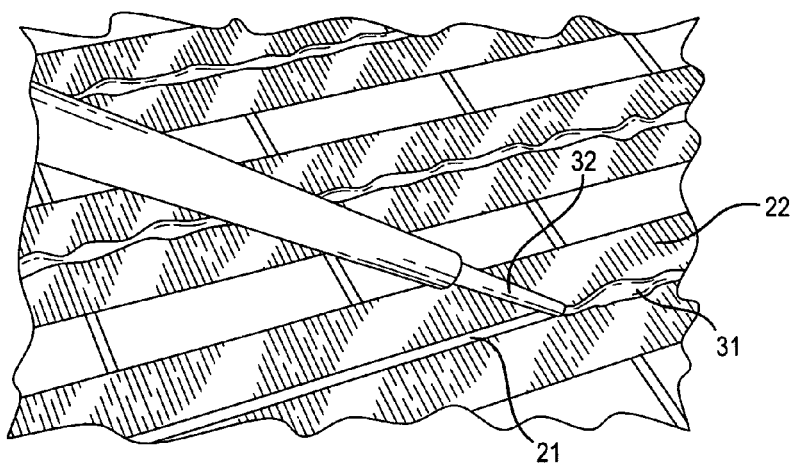

FIG. 3 depicts step 13 with the dispensing gun 35 applying epoxy grout 31 through a static mixing applicator nozzle p 32 into the joint 21 between the strips of masking tape 22.

Figure 3B:
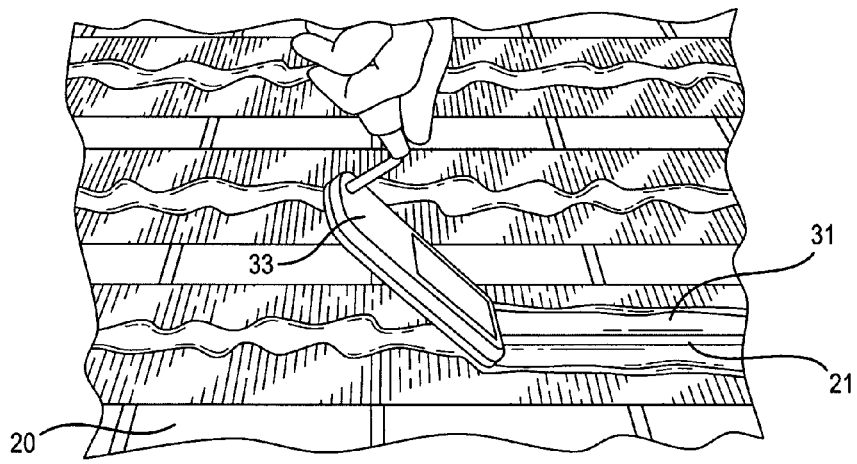

FIG. 3B depicts step 14 wherein the epoxy grout 31 is smoothed into the joint 21 between tiles 20 with a leveling tool 33.

Figure 3C:
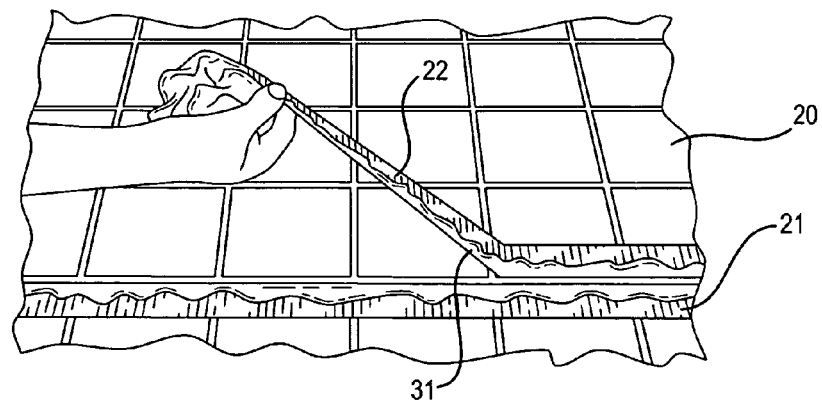

FIG. 3C depicts step 14 which is the removal of tape 22 from both sides of the joint 21.

The reactive epoxy based floor grout 31 used in this unique process was especially formulated to be packaged in cartridges 34 and is labeled as Marcoat® floor grout epoxy. This product was developed to have the highest solvent resistance possible to withstand harsh environments, where heavy foot traffic, aggressive cleaning agents including acids and/or enzymes cleaners are used daily, to have no objectionable odor, and capable of being applied to wet and or cold surfaces and still cure within the design time. This product has been field tested in actual commercial kitchen main line floors with no breakdown, or loss of physical strength properties, even though the quarry tiles became cracked and developed broken edges due to high traffic and heavy objects impacting the tiles. Color fastness is achieved with high loading of pigmentation in the grout formulation which maintains color even with bleach or other oxidizing chemicals being used for cleaning. 31

The epoxy 31 is a two-part, meter-mix, 100% reactive formulation with a 2:1 mix ratio of epoxy resin 23 to hardener 24, although mix ratios of 1:1, 4:1 and 10:1 can be used with the appropriate hardeners if so formulated and are covered by this application. The mixed epoxy 31 cures rapidly to give tack free surfaces in less than two hours and full service within eight hours. The hardener was chosen for its solvent resistant properties, color stability and ability to cure quickly in wet, cold, and damp environments. The resin blend has extremely fast curing characteristics while maintaining the highest strength and cross-linking density. The resin 23 and hardener 24 have closely matched viscosities and specific gravities to allow mixing in a static mixer tube 36 and being applied directly to the grout line 21 between tiles 20. The mixed epoxy 31 has a high level of a non-hazardous mildewcide to prevent fungi, mold, mildew or other bacteria from forming on the surface of the mixed, cured epoxy or in the grouted joint.

The static mixer tube 36, which is affixed to the packaging cartridge 34 (step 11) allows complete mixing of the two components, while avoiding any operator contact with the two components. The mixer tube 36 comprises a hollow plastic tube 37 with an internal mixing baffle system 38 that is readily disposed of as cured plastic in a landfill. Upon mixing within the static mixer tube 36, the hardener 24 odor becomes non-detectable in the grout joint 21. Dispensing by the mixer tube 36 directly into the tile grout joints 21 wets the tile edge surfaces 20, and forms a non-shrink, totally filled joint line 21 with no boundary layer leak paths on the edge walls of the tile 20. The cartridge 34 that the epoxy 31 is packaged in was especially chosen for the cartridges of large size, easy dispensability and having commercially available pneumatic guns for dispensing, and being compatible with very long, heavy-wall mixer tubes. The plastic cartridge when empty is approved for disposal in landfills or incineration.

Marcoat's® two-part epoxy grout 31 is packaged in large cartridges for cost effectiveness such as 900 ml cartridges 34; one side contains 600 ml of resin 23 and the other side contains 300 ml of pre-colored hardener 24. Other cartridge size and mix ratios are also covered in this patent application. The static mixer tube 32 is then attached to the epoxy cartridge 34 as noted in step 12.

The applicator static mixer nozzle 32 is next placed into the exposed naked grout joint 21 (step 13) after masking tape 22 has been placed on either side (step 14). The operator then begins to dispense premixed Marcoat® epoxy grout 31 directly into the grout joint 21. He runs a steady bead along the length of the tape 22 with the mixture slightly overflowing the tile top as he applies the Marcoat® epoxy grout 31. Once the taped grout joint end is reached, the operator then moves over the next pretaped grout line 21 and applies Marcoat® epoxy grout 31. All lines 21 running in one direction are filled with premixed grout 31.

A leveling tool 33 is used to spread the Marcoat® epoxy grout 31 deep and even into the grout joint 21 (step 14). The operator runs the leveling tool 33 along the grout joint 21 smoothing out the overflowed Marcoat® epoxy grout 31. The excess will accumulate on the leveling tool or spread onto the 2" wide masking tape 22. After all taped joint-lines have had the Marcoat® epoxy grout 31 spread by the leveling tool 33 the tape 22 is peeled off (step 15) and discarded into the trash. Any epoxy material on the tape or disposable tool will cure and become inert and non-hazardous.

After the tape 22 has been peeled off, the Marcoat® grout 31 is spread out evenly into the grout joints 21 and will become tack free within sixty-eighty minutes at 72° F. By feeling the Marcoat® epoxy grout 31, the technicians are able to determine when the surface of the Marcoat® epoxy grout 31 is tack free (step 16). Once tack free, the taping process is repeated in direction #2, perpendicular to the first direction, going over the Marcoat® epoxy grout 31 applied in direction #1.

As previously, a 2" wide making tape 22 is applied to each side of the naked grout joint 21 so that only the joint 21 is exposed which runs in the opposite direction from the previously laid tape 22. The tape 22 is run in continuous line 21 in the same direction up to a maximum of 100' long. The second tape 22 will be running over and across cured Marcoat® epoxy grout 31. All joints 21 are taped 22 that are in need of grout 31.

A grout cartridge 34 (step 1) is loaded into the dispensing gun and the static mixer tube 36 (step 11) is attached to the cartridge front end. After static mixer tube 32 is mounted and a small amount of grout 31 is dispensed out through the mixing tube 32 to insure it is properly mixed and evenly balanced. The nozzle 32 is then placed into the exposed naked grout joint 21 having the masking tape 22 on either side. The operator dispenses mixed Marcoat® epoxy grout 31 directly into the grout joint 21 and runs a steady bead along the length of the tape 22 slightly overflowing the top of the joint 21 (step 13). Once the taped end is reached, the operator then moves over to the next pretaped grout line 21 and applies the Marcoat® epoxy grout 31 there. All lines running in the second direction are filled with premixed grout 31.

As with the joints 21 running a first direction, a leveling tool 33 is used to spread the Marcoat® epoxy into and along the grout joint 21 (step 14). The operator runs the leveling tool 33 along the grout joint 21 and over the overflowed Marcoat®. The excess will spread over onto the masking tape 22 which is readily removed (step 15) and the grout 31 will cure within the grout joint (step 16)

Initially, all floor areas to be worked on must be cleaned of all debris and air-dried to eliminate excess water in and around the grout joint 21 (step 17). No work of any kind is to proceed until the floor is properly cleaned and air-dried.

A high-speed (10,000 rpm) light wall slotter machine having a diamond blade cutting wheel and shroud hooked up to a vacuum is used to remove existing grout dust 30 (step 18). Having a shroud and vacuum insure that no dust is created during the cutting process. This is an important safety and environmental concern for the operators as well as the cleanliness of the work area for use the next day.

In a further embodiment, the process would involve using reactive two-part methyl methacrylate (mma) adhesives that can be made into a paste and dispensed from a two-part cartridge using a mixer tube. In addition, a two-part reactive urethane could be used as well.

This application also pertains to a new concept of using a low viscosity, self leveling, liquid reactive two part epoxy floor grouting material to be used in "secondary" floor areas of commercial kitchens, bathrooms, etc., where lighter foot traffic and less harsh cleaning methods are used. The main cook line is the most severely treated floor area in a commercial kitchen where people stand all day long and cleaning is with the strongest agents. This area requires the heavy viscosity filled epoxy grout 31 in the preferred embodiment of the invention.

Secondary areas do not need the same level of protection but can use the same epoxy constituents made into a liquid with a low viscosity for easy "pouring" or pumping into a grout joint 21 where the liquid will self level and form a continuous grout line. The liquid is really a "cap" which can be used over partially removed existing grout (old mortar or old epoxy types) which is cut down to a level to have a clean, fresh surface exposed for the new epoxy 31 to adhere to. This cut can be one-eighth to three sixteenths deep into the old existing grout in a renovation project which is approximately one-half of the depth of the existing grout. One would only use one-half the amount of new epoxy 31 to fill this joint providing a large material cost savings. The purpose of the "cap" is to seal the side of the tiles and also to be supported by the existing grout left in the joint.

In new construction where existing grout does not exist, a two-part process of using a low cost grout-filling agent to fill the grout joints 21 halfway up would be used with the liquid epoxy cap the same as above. The low cost grout base would be very fast curing, 20 minute serviceable, durable, and compatible with the epoxy grout 31 so that very large areas could be grouted in short periods of time.

The exact same raw materials are used to make the epoxy for both liquid as well as the paste type grout so it has the same cured performance. Testing with solvents and cleaning agents show the same level of performance in resisting degradation with the liquid being used as a protective coating over mortar grout as with the 100% epoxy grout 31 in a joint line type test. The epoxy surface takes 90% of the wear and so whether it is a ⅛ or ⅜ thick does not really matter as long as it seals the edges of the tiles to prevent any damaging liquids from getting into the substructure grout.

In this latter embodiment, the process to cut into the existing grout, down ⅛" to 3/16" with a diamond saw to expose a clean layer of grout and to provide sufficient depth to allow the reactive epoxy grout 31 to form a protective layer (cap).

The epoxy components are heated to 30-50° C. (Step 10), mixed together, poured into a dispensing cartridge (single barrel), and sealed with rear plunger seal. The cartridge is positioned into a dispensing gun 35, either manual or pneumatic. A small diameter-dispensing tip is then opened to dispense low viscosity liquid directly into a prepared (diamond cut) grout joint 21 and let self-level up to the tile face surface. If needed some "dams" are formed for area filling to keep the liquid in specific areas for easier processing. Rubber squares are used to fit the joint opening. The epoxy will self level and fill the joint line and cure rapidly due to the preheating. The joint line is attractive, needs no taping, little cleanup and large areas can be filled in one shift.

The grouting materials involve a reactive two-part epoxy grout 31 (supplied in pre-measured separate containers). One part of the epoxy grout 31 involves resin in a 2:1 mix ratio of as an example although 1:1, 4:1, 10:1 or other mix ratios can be used. The second part involves a hardener.

The dispensing system to apply mixed epoxy grout 31 directly to the grout joint 21 involves a single cartridge for dispensing mixed epoxy Semco 300 ml HDPE or equivalent single barrel cartridge. A wiper to seal the rear end of cartridge and allow for gun 35 dispensing Semco 300 ml LDPE plunger or equivalent and, a nozzle tip 32 for dispensing low viscosity liquid mixtures that is compatible with cartridge are used.

The dispensing (caulking type) gun 35 is capable of accommodating the above-mentioned cartridge and providing mechanical advantage to force the liquid out of the cartridge in a controlled manner.

Preheating the equipment for preparing epoxy parts involves an oven, incubator, or hot water bath at temperatures of 30-50° C. Microwaving may also be used to heat the component epoxy parts up to the desired temperature.

The process involves placing unopened resin and hardener containers into a heating chamber or other media, and allowing material to heat to a desired elevated temperature. After sufficient time to reach the predetermined temperature, for example equilibration time sixty minutes in hot air convection oven, 20 minutes in a hot water bath and less than thirty seconds in a microwave, the resin and hardener containers are removed from heating chamber. The lids are removed and pour entire contents of the hardener container are poured into the resin container.

The resin container is mixed lightly by stirring for approximately thirty seconds with wood paint paddle or other stirring device. The product is thoroughly mixed when the predominant hardener color is uniform throughout, with no streaks of resin showing. Once preheated resin and hardener are mixed, the epoxy 31 has a defined pot life in this large mass of nominally ten minutes.

Next, the entire contents of the mixed container are poured into a dispensing cartridge that has been outfitted with nozzle tip 32. A plunger is inserted into the back end of cartridge and the sealed cartridge is placed into dispensing (caulking) gun 35.

The front of the nozzle is opened and the gun 35 is held so that the nozzle tip 32 is touching the base of the grout joint 21. The operator begins dispensing epoxy grout 31 into the grout joint 21 continuously until the cartridge contents are emptied The process is repeated until enough epoxy grout 31 has been dispensed into joints so that the joint is filled to the top of the tiles without spilling over The process eliminates the need for taping or protecting the tile faces since epoxy 31 is applied directly to the grout joint 21 by pumping the liquid epoxy 31 into the joint 21 to fill the joint up to the top level of the floor tile. By careful application, the epoxy grout 31 does not come out of the grout joint 21 but fills it to the top to make an even, level surface when cured.

If regrouting, lower levels of existing grout material can be removed from the grout joint 21 since the low viscosity, self-leveling epoxy grout 31 can create a long-term durable sealed surface over existing mortar or other types of grouts. For example, grout removal of one-eighth to one-forth inch of the existing grout in the joint could be removed for the new reactive epoxy grout 31 to be used to cap and seal the grout joints 21. This reduces the removal work time as well as the amount of new reactive epoxy grout 31 needed to seal the surface at approximately one-half the material cost.

Preheating the premeasured separate epoxy grout 31 components before mixing accelerates the cure rate to allow faster processing, lowers the mixed epoxy viscosity for easier self leveling, and allows for air release during the dispensing and curing cycles. The process results in cost savings in labor and material usage in doing large areas of light traffic floor areas such as storage, freezer, secondary aisles and under tables or protected areas. It is not intended for cook line or heavy traffic or harsh environments.

While the invention has been explained by a detailed description of certain specific embodiments, it is understood that various modifications and substitutions can be made in any of them within the scope of the appended claims that are intended also to include equivalents of such embodiments.

What is claimed is:

1. A process of grouting tiles having joints between adjacent tiles with a reactive two-part methyl methacrylate comprising the steps of:
    removing existing grout from the joint between adjacent floor tiles using a diamond-cutting wheel including a shroud to eliminate dust;
    placing tape on both sides of the joint from which the grout has been removed;
    formulating two-part methyl methacrylate grout into a viscosity having a grout-like consistency;
    prepackaging the two-part methyl methacrylate grout into a two-part cartridge;
    dispensing the cartridge through a static mixer tube directly from the cartridge to mix the two components and applied the mixture directly into the grout joint after the following steps; and,
    removing the tape and waiting a predetermined time interval for the grout to cure.

2. A process of grouting with a two part epoxy floor grout on tiled floors having joints between adjacent tiles comprising the steps of:
    removing existing grout from the joint between adjacent floor tiles using a diamond blade cutting wheel including a shroud coupled to a vacuum to eliminate dust;
    placing tape on both sides of the joint from which the grout has been removed;
    loading a prepackaged epoxy cartridge into a pneumatic dispensing gun and affixing a static mixer tube;
    mixing the epoxy resin and hardener in the static mixer;
    applying the epoxy grout directly to the grout joint from the dispensing gun cartridge via the mixer tube smoothing out the grout into the grout joint with a rubber margin trowel; and
    removing the tape and waiting a predetermined time interval for the two-part reactive epoxy grout to cure.

* * * * *